June 15, 1954
C. W. PALOSAARI
2,680,907
FOOD CHOPPER
Filed May 29, 1952
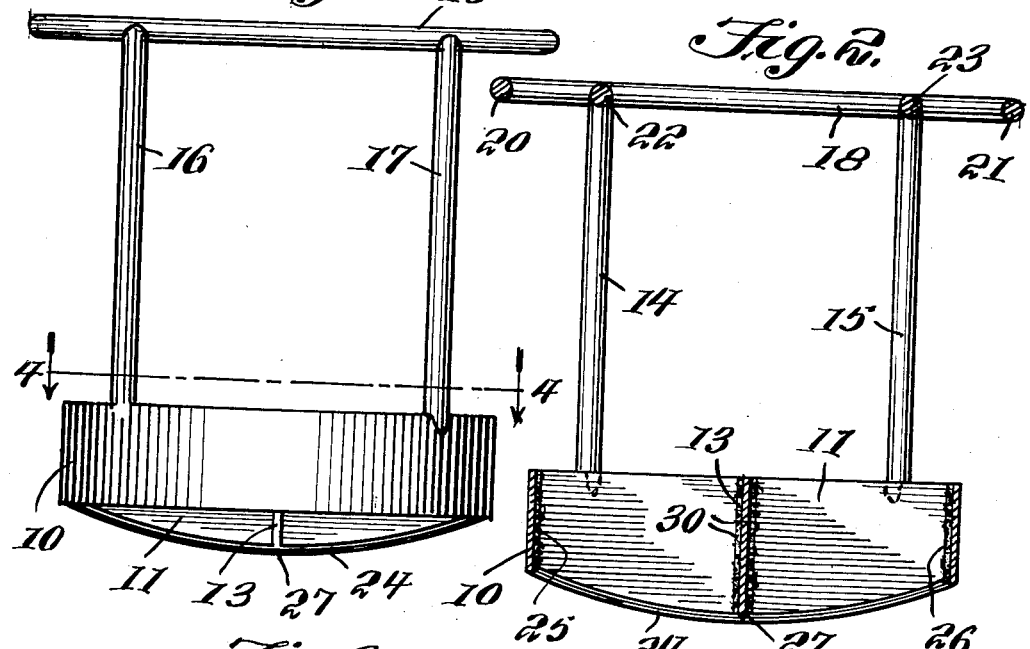
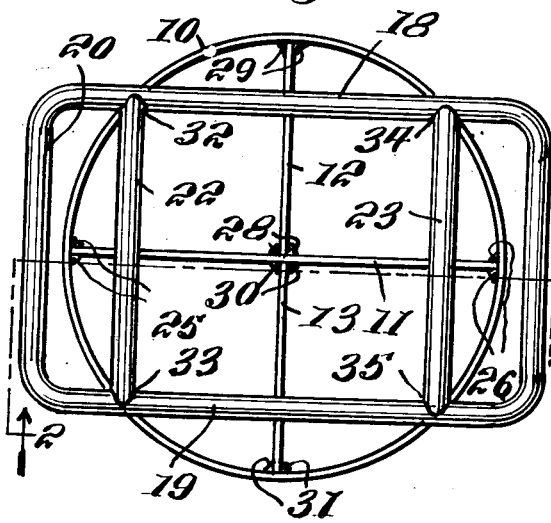
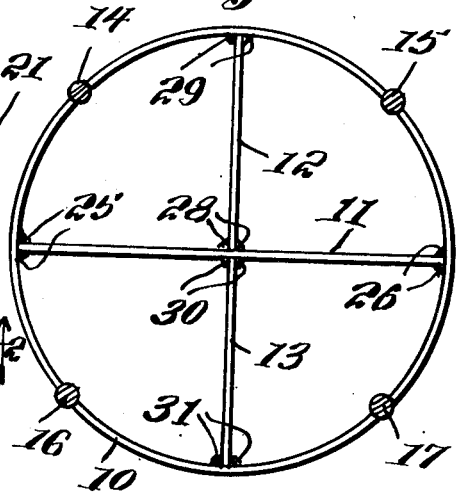
INVENTOR.
*Carl W. Palosaari,*
BY *Victor J. Evans & Co.*
ATTORNEYS Patented June 15, 1954

2,680,907

UNITED STATES PATENT OFFICE 2,680,907

FOOD CHOPPER

Carl W. Palosaari, Calumet, Mich.

Application May 29, 1952, Serial No. 290,752

2 Claims. (Cl. 30—302)

This invention relates to devices for chopping food by hand, and in particular a pair of vertically positioned cutting knives positioned in the form of a cross with the ends integral with a surrounding vertically disposed band and with the band secured by posts to a horizontally positioned frame providing a handle.

The purpose of this invention is to provide a food chopper that is adapted to be actuated with a positive movement whereby food may be readily chopped by hand.

Food choppers of this type have been provided in various designs and wherein devices of this type are readily adapted for chopping special products it has been found that a food chopper for universal use should have right angularly disposed blades with arcuate cutting edges rigidly supported in a circular band. With this thought in mind this invention contemplates a method of forming and assembling chopping blades whereby two blades positioned in the form of a cross with one perpendicular to the other are secured in a circular band whereby open areas are provided in sectors within the band and whereby the band is securely connected to a superimposed handle so that the blades may be readily actuated by hand.

The object of this invention is, therefore, to provide means for positioning and mounting cutting blades of a food chopper whereby products may be efficiently chopped by hand.

Another object of the invention is to provide a hand actuated food chopper that is adapted to be actuated with a single hand or with both hands of an operator.

A further object of the invention is to provide an improved food chopper which is of a simple and economical construction.

With these and other objects and advantages in view the invention embodies a circular band having right angular positioned cutting knives with arcuate lower edges mounted in and integral with the band and a horizontally disposed frame providing a handle and having transversely positioned bars therein connected by spaced posts to the band.

Other features and advantages of the invention will appear from the following description taken in connection with the drawing, wherein:

Figure 1 is a side elevational view illustrating the improved food chopper.

Figure 2 is a cross section through the chopper taken on line 2—2 of Fig. 3.

Figure 3 is a plan view of the food chopper.

Figure 4 is a sectional plan taken on line 4—4 of Fig. 1 illustrating the mounting of the cutting blades of the chopper.

Referring now to the drawing wherein like reference characters denote corresponding parts the improved food chopper of this invention includes a circular band 10 with a continuous blade 11 extended through the center from one side to the other, with right angular positioned blades 12 and 13 connecting the blade 11 at the center to the band 10, posts 14, 15, 16, and 17 and a frame including side bars 18, 19, end bars 20 and 21 and intermediate transversely positioned bars 22 and 23.

The band 10 the lower edge of which is sharpened to provide a cutting edge is continuous and the lower ends of the posts are secured, preferably by welding, to the upper edge thereof, as illustrated in Figs. 1 and 2.

The cutting blade 11, which is provided with an arcuate lower cutting edge 24 is mounted in the band 10 with the ends of the blade secured, preferably by welding to the band at points 25 and 26.

The cutting blades 12 and 13, which are also provided with arcuate lower edges, as indicated by the numeral 27 are positioned between the blade 11 and the band, the blade 12 being secured to the blade 11 at the point 28 and to the band 10 at the point 29 and the blade 13 being secured to the blade 11 at the point 30 and to the band 10 at the point 31.

The frame, providing the handle, is preferably formed of continuous round stock with the transversely positioned bars 22 and 23 secured, preferably by welding, to the inner surfaces of the side bars 18 and 19, the bar 22 being secured to the bar 18 at the point 32 and to the bar 19 at the point 33 and the bar 23 being secured to the bar 18 at the point 34 and to the bar 19 at the point 35.

With the parts arranged and assembled in this manner an improved food chopper is provided that may readily be gripped with one or both hands of the operator and with the cutting blades positioned in the cross and having arcuate lower cutting edges food may be efficiently chopped thereby.

It will be understood that modifications, within the scope of the appended claims, may be made in the design and arrangement of the parts without departing from the spirit of the invention.

What is claimed is:

1. A food chopper comprising a circular vertically disposed band having a lower cutting edge, a cutting blade having an arcuate lower cutting edge extended through the center of the band from one side to the other side, intermediate cutting blades also having arcuate lower cutting edges extended from the former blade to oppositely positioned points at the sides of the band, said intermediate blades being positioned perpendicular to the former blade, a horizontally disposed frame having side and end bars with intermediate transversely disposed bars spaced from the end bars and providing handles, and posts connecting said band to said frame intermediate of the points at the sides of the band to which the blades extend.

2. In a food chopper, the combination which comprises a vertically positioned circular band having a lower cutting edge, a cutting blade having an arcuate lower cutting edge extended through the center of the band and from one side to the other, intermediate blades having arcuate lower cutting edges extended from the center of the former blade to opposite sides of the band, said intermediate blades being positioned perpendicular to the former blade, spaced vertically disposed posts extended upwardly from points on the band positioned midway between the points where the ends of the blades are connected to the band, and a horizontally disposed frame having side and end bars with intermediate transversely positioned bars forming handles spaced from the end bars positioned on the upper ends of said posts.

References Cited in the file of this patent

UNITED STATES PATENTS

| Number | Name | Date |
|---|---|---|
| 726,707 | Lavender | Apr. 28, 1903 |
| 1,110,946 | Lahiere | Sept. 15, 1914 |
| 1,271,218 | Powell | July 2, 1918 |
| 1,364,863 | Buchtel | Jan. 11, 1921 |
| 1,581,310 | Fetschan | Apr. 20, 1926 |
| 1,598,404 | Tally | Aug. 31, 1926 |